United States Patent [19]

Saito

[11] Patent Number: 4,756,719
[45] Date of Patent: Jul. 12, 1988

[54] PORTABLE FUEL COMPOSITION

[75] Inventor: Yoshitami Saito, Tokyo, Japan

[73] Assignee: Shinagawa Fuel Co., Ltd., Tokyo, Japan

[21] Appl. No.: 766,583

[22] Filed: Aug. 19, 1985

[30] Foreign Application Priority Data

Aug. 23, 1984 [JP] Japan ................ 59-175607

[51] Int. Cl.$^4$ .................... C10L 11/00; C10L 7/00
[52] U.S. Cl. ................................ 44/541; 44/641; 44/7.7; 44/25
[58] Field of Search .............. 44/21, 2.5, 7.7, 6, 44/40, 41

[56] References Cited

U.S. PATENT DOCUMENTS

| | | | |
|---|---|---|---|
| 301,243 | 7/1884 | Kiesewetter | 44/21 X |
| 392,868 | 11/1888 | Kimplen | 44/21 |
| 3,232,720 | 2/1966 | Kepple | 44/7.7 |
| 3,262,765 | 7/1966 | Wimmer | 44/7.7 |
| 3,437,463 | 4/1969 | Maloney et al. | 44/7.7 |
| 3,437,464 | 4/1969 | Maloney | 44/7.7 |
| 4,083,697 | 4/1978 | Smith et al. | 44/25 X |
| 4,293,313 | 10/1981 | Fox | 44/21 X |
| 4,322,219 | 3/1982 | Burns | 44/25 X |

FOREIGN PATENT DOCUMENTS

| | | | |
|---|---|---|---|
| 71101 | 6/1978 | Japan | 44/10 A |
| 25391 | 2/1983 | Japan | 44/1 D |
| 901789 | 7/1962 | United Kingdom | 44/25 |

OTHER PUBLICATIONS

Mokuzai Kogyo-vol. 36-5, pp. 210-216, May 1, 1981.

*Primary Examiner*—Carl F. Dees
*Attorney, Agent, or Firm*—Jacobs & Jacobs

[57] ABSTRACT

A novel portable fuel composition comprises 10 parts by weight of combustible polymer such as polypropylene, 20-35 parts by weight of organic solvent such as petroleum solvent and 3-9 parts by weight of coarse powder of fiber material such as sawdust, and optionally metal powder and dye. The composition is convenient for carrying and has a high degree of viscosity and calorific value. It can be utilized as a fuel for camping, for emergency, for preheating of a liquid fuel stove, for a simple portable cooking stove, or as a starter for igniting firewood.

15 Claims, No Drawings

PORTABLE FUEL COMPOSITION

BACKGROUND OF THE INVENTION

1. Field of the Invention

The present invention relates to a portable fuel composition which has a high degree of calorific value, particularly to a fuel composition which is convenient for carrying and which has a high degree of calorific value and which comprises combustible polymer, organic solvent and fiber material.

2. Description of the Prior Art

Up to now, canned alcoholic solid fuels and alcoholic jellied fuels in bags have been sold as portable fuels. Further, a jellied or creamy fuel containing alcohols as the principal ingredient and packed in tubes has been sold under the name of Gerunen by DAIKENTOP, a Japanese company. However, said alcoholic fuels have disadvantageously low calorific values of only about 4,500 kcal/kg.

As an improved alcoholic fuel with increased calorific value, there is known a product in tubes sold under the name of META by LONZA Ltd., a Swiss Company which is prepared by adding ethylene or the like to the alcoholic fuels. However, the calorific value of META is still only about 6,000 kcal/kg, which cannot be said to be a great improvement over the conventional alcoholic fuels.

On the other hand, waste polymers, such as still residue, waste and the like, are generally by-products of processes for preparing or molding polymers. Up to now these waste polymers have been disposed of by incineration or burying.

Further, atactic polypropylene (hereinafter referred to as APP) is obtained as a by-product in processes for preparing polypropylene (hereinafter referred to as PP) which is a general-purpose resin. The amount of APP produced as a by-product varies depending upon the kind of production process used and the operating conditions but its presence in PP is tolerable up to about 5–10% of the amount of PP produced. However, APP is amorphous and lowers the properties of PP resin products. Therefore, it is better for it not to be contained in the final products and so it is generally separated from the PP after polymerization of propylene.

Therefore, the appearance of new methods of applying waste polymers, such as APP and the like, has been sought from the standpoint of effective utilization of resources and prevention of environmental pollution.

Further, in the technical field of portable fuels, a solid fuel which is obtained by mixing, kneading and compression molding APP and bark in the ratio of 1:3 has been proposed on Mokuzai Kogyo, vol. 36, No. 5. However, no such fuel has yet been put to practical use.

SUMMARY OF THE INVENTION

An object of the present invention is to provide a portable fuel composition having a high calorific value of, for example, about 8,000 kcal/kg.

A further object of the present invention is to provide a portable fuel composition utilizing waste polymer, such as still residue produced in a process for preparing combustible polymer and APP which is a by-product of PP.

A still further object of the present invention is to provide a gelatinous portable fuel composition which has a high degree of viscosity and is convenient for carrying.

Another object of the present invention is to provide a portable fuel composition which has satisfactory combustion properties.

In view of the situation in the field of portable fuels, the inventors focused their attention on the physical properties of waste polymers and investigated various portable fuels. As a result, they found that a gelatinous portable fuel composition which has a high calorific value and viscosity and is convenient for carrying can be obtained by dissolving combustible polymers, preferably waste polymer such as APP and the like, in an organic solvent, preferably petroleum solvent, and then mixing the combustible polymers dissolved in the organic solvent with the coarse powder of a fiber material in a prescribed ratio.

Namely, the present invention relates to a portable fuel composition comprising 10 parts by weight of combustible polymers, 20–35 parts by weight of organic solvent and 3–9 parts by weight of coarse powder of fiber material.

DESCRIPTION OF THE PREFERRED EMBODIMENT

All the combustible polymers are included within the concept of the polymer used in the present invention. For example, polymers such as PP, polyethylene, (hereinafter referred to as PE) and the like can be used as the combustible polymer of the present invention. PP is preferably APP. APP is generally defined as a polymer obtained as a by-product of the polymerization process of propylene to isotactic polypropylene. Further, both low density PE and high density PE can be preferably used as PE.

In order to obtain the fuel composition with the high calorific value of the present invention, it is preferred to use a polymer having a high degree of heat of combustion per unit weight as the combustible polymer.

From the standpoint of effective utilization of resources and economic efficiency, in the present invention, it is preferred to use waste polymers of the combustible polymers, such as PP, PE and the like. The waste polymers used in the present invention can be exemplified by still residue produced in a process for preparing polymers, APP or the like separated in a process for preparing PP, industrial waste such as waste polymers and salvaged polymers produced in a process for molding, and general waste obtained from domestic refuse.

In the present invention, commercially obtainable combustible polymer products can be also satisfactorily used.

Further, polymers which are satisfactorily available as a raw material of the present invention do not depend on production processes of the polymers, operating conditions, molecular weight, viscosity, the form thereof, and the like.

The combustible polymer may be used independently or in the form of a mixture comprising at least two members thereof.

In the present invention, any combustible organic solvent able to dissolve the combustible polymer can be used as an organic solvent for dissolving said combustible polymer. Such organic solvents are exemplified by petroleum solvent and the like. Gasoline (boiling point: 30°–180° C.) is preferably used as said petroleum solvent. Specifically, petroleum ether (boiling point:

40°–70° C.) petroleum benzine (50°–80° C.), ligroin (80°–120° C.) are preferred and ligroin is the most preferred in practical use.

It is advantageous solvent with high calorific value for the present invention so as to obtain a fuel composition possessing a high calorific value. The organic solvent described above can be used independently or in the form of a mixture comprising at least two members thereof.

Natural, semi-synthesized and synthesized fiber materials are included within the concept of the fiber material used in the present invention. The fiber materials are exemplifed by sawdust produced by a lumber mill, powder of coconut husk, rice hulls and other such, with sawdust being preferred. Taking combustibility into account, the fiber material is preferably in the form of coarse rather than fine powder, and is preferably about 20–40 mesh. For economic efficiency, it is preferred to use fiber material which has been treated as a by-product or waste.

A low water content of the fiber material is preferred so as to obtain a fuel composition having a high calorific value. Preferably the water content of the natural fiber material is less than 25–35% of the fiber saturation point.

The fiber material is considered to act like the wick of a candle which controls the production of soot and improves the combustibility of the fuel composition. Therefore, calorific value and rate of combustion can be controlled by varying the mixing ratio and the size of the fiber material.

A process for preparing the composition of the present invention is illustrated as follows.

A combustible polymer is mixed with an organic solvent, for example petroleum solvent, and is dissolved, whereby a viscous liquid is obtained. When the raw material polymer is in lump form, it is preferable to grind it into small particles which are then dissolved in the solvent. The dissolution of the polymer may be carried out either at room temperature or with heating particularly with heating to near the boiling point of the solvent as this tends to shorten the dissolution period. Further, the dissolution may be opptionally carried out under agitation.

Then, coarse powder of the fiber material is added to the viscous liquid and mixed therewith by stirring until the fiber material is dispersed uniformly. Then, the resultant mixture is charged into containers such as plastic tubes, metal cans or the like. When the polymer is dissolved under heating, the charging step follows a cooling step.

The organic solvent is used in the range of 20–35 parts by weight to 10 parts by weight of the combustible polymer. The fuel composition of the present invention can be obtained at a viscosity desirable for portable fuels, specifically at a viscosity about 8000–10000 cP (at 25° C.), by using the solvent within the above range, and the viscosity of the portable fuel can be varied within the above range by controlling the ratio of the organic solvent and the combustible polymer.

The fiber material is used in the range of 3–9 parts by weight to 10 parts by weight of the combustible polymer. By using the fiber material within this range it is possible to prevent production of a large amount of soot and to obtain a fuel composition exhibiting a high calorific value and having good combustibility.

Moreover, the combustibility and flame brightness can be varied by adding a fine metal powder such as of aluminum or magnesium to the fuel composition of the present invention. The amount of the added metal powder can be in the range of about 1–5% by weight as against the total weight of the combustible polymer, the organic solvent and the fiber material.

Furthermore, the appearance, color and combustibility of the fuel composition produced may be optionally changed by adding a small amount of dye as another addition to the composition.

Further, other additives may be used optionally.

The fuel composition of the present invention obtained as described above may be packed in containers and stored before being sold. For portability, it is particularly advantageous to pack the composition in tubes because this makes it easy to prevent the solvent in the composition from vaporizing simply by covering the tube with a cap.

The portable fuel composition of the present invention can be utilized as a fuel for camping, for emergency use or for preheating of a liquid fuel stove of the type used by mountain climbers. Furthermore, it can be used as a fuel for a simple portable cooking stove or as a starter for ignition of firewood.

The calorific value of the fuel composition of the present invention can be calculated from the calorific values of the polymer, solvent and additives, and the water content of the composition.

The calculated value is within plus or minus 2% of the actually measured calorific value and therefore, a fuel composition exhibiting a desired calorific value and combustibility can easily be prepared.

The following Examples illustrate the invention.

EXAMPLE 1

100 Grams of ground APP with a water content of 1.4% and 250 grams of ligroin were placed in a vessel having a condenser, a stirrer and a thermometer and were stirred thoroughly in an 80° C. hot water bath. Dissolution of APP was completed in 15 minutes and a viscous liquid was obtained. Then 70 grams of sawdust (about 20 mesh) with a water content of 22% was added slowly to the viscous liquid and mixed therewith by stirring. After the sawdust has been uniformly mixed in, the mixture obtained was allowed to cool to room temperature and the fuel composition of the invention was obtained. The fuel obtained was charged into a 500 ml tube.

The fuel composition contained 4.85% water (measured by the Karl Fisher method) and exhibited 8500 kcal/kg of calorific value (measured by a calorimeter).

EXAMPLE 2

100 Grams of gound APP containing 0.9% water and 200 grams of ligroin were placed in the same vessel as that mentioned in Example 1 and were stirred in an 80° C. hot water bath until the APP was dissolved uniformly. Dissolution of APP was completed in 15 minutes and a viscous liquid was obtained. 30 grams of waste fiber by-produced in a paper factory (slag) containing 15% water was added slowly to the viscous liquid and mixed therewith by stirring. After the fiber had been dispersed uniformly, the resultant mixture was allowed to cool to room temperature and the fuel composition of the invention was obtained. Then the dispersion was charged into a 500 ml tube.

The fuel obtained contained 1.66% water (measured by the Karl Fisher method) and exhibited 8850 kcal/kg of calorific value (measured by a calorimeter).

EXAMPLE 3

100 Grams of ground APP containing 2.5% water and 300 grams of ligroin were placed in the same vessel as that mentioned in Example 1 and were stirred in an 80° C. hot water bath. Dissolution of the APP was completed in 12 minutes and a viscous liquid was obtained. 50 grams of sawdust containing 10% water (20 mesh) and 10 grams of aluminum powder were added to the viscous liquid slowly and mixed therewith by stirring, whereby a silver uniform liquid was obtained. Then the liquid was allowed to cool to room temperature and the fuel composition of the invention was obtained. The composition was charged in a 500 ml tube.

The composition contained 1.6% water (measured by the Karl Fisher method) and exhibited 8950 kcal/kg of calorific value (measured by a calorimeter).

The fuel composition of the present invention exhibits about 8500-9000 kcal/kg of calorific value which is twice that of conventional alcohol solid fuels. Further, the composition can be utilized for solid fuels, but also as a starter by applying it to the surface of fire-wood. It is particularly useful for starting a fire-wood fire using wet fire-wood on a rainy day.

Furthermore, the composition is easy to pack in tubes or the like because it is gelatinous. In addition, the composition can easily be prevented from evaporation of its solvent and can be removed from its container in precisely the amounts required, which leads to improved safety and minimizes waste. Further, by squeezing the composition out onto a surface in the form of letters and igniting it to produce flaming message the composition can be used for signaling.

It is apparent that various modifications may be made in the preparation and application of the novel portable fuel composition of this invention, without departing from the invention concept herein, as defined in the following claims.

I claim:

1. A gelatinous portable fuel composition comprising 10 parts by weight of at least one combustible polymer selected from the group consisting of polypropylene and polyethylene, 20-35 parts by weight of an organic solvent capable of dissolving said organic polymer and 3-9 parts by weight of coarse powder of fiber material having a particle size of 20-40 mesh, said composition having a viscosity of 8,000-10,000 cp at 25° C.

2. A composition of claim 1 wherein the polypropylene is atactic polypropylene.

3. A composition of claim 1 wherein the organic solvent is petroleum solvent.

4. A composition of claim 1 wherein the fiber material is natural fiber material.

5. A composition of claim 1 wherein the composition contains metal powder.

6. A composition of claim 1 wherein the composition contains dyes.

7. A method for utilizing a composition comprising 10 parts by weight of combustible polymer selected from the group consisting of polypropylene and polyethylene, 20-35 parts by weight of organic solvent capable of dissolving said organic polymer and 3-9 parts by weight of fiber material having a particle size of 20-40 mesh, the viscosity of said composition being 8,000-10,000 cp at 25° C., as a gelatinous portable fuel.

8. A method of claim 7 wherein the composition is put to use as a starter for igniting firewood.

9. A method of claim 7 wherein the polypropylene is atactic polypropylene.

10. A method of claim 7 wherein the organic solvent is petroleum solvent.

11. A method of claim 7 wherein the fiber material is natural fiber material.

12. A method of claim 7 wherein the composition contains metal powder.

13. A method of claim 7 wherein the composition contains dyes.

14. A gelatinous portable fuel composition of claim 1 packed in an open tube closed by a removable cap.

15. The packaged composition of claim 14, wherein the tube is a squeeze tube.

* * * * *